US008320889B2

(12) United States Patent
Lee

(10) Patent No.: US 8,320,889 B2
(45) Date of Patent: Nov. 27, 2012

(54) METHOD FOR AUTOMATIC PRESENTATION OF INFORMATION BEFORE CONNECTION

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1005 days.

(21) Appl. No.: 11/786,848

(22) Filed: Apr. 12, 2007

(65) Prior Publication Data

US 2008/0254773 A1  Oct. 16, 2008

(51) Int. Cl.
H04M 3/42 (2006.01)
(52) U.S. Cl. .............. 455/414.1; 370/260; 705/14.5
(58) Field of Classification Search .......... 348/619; 386/E9.2; 375/232, 240; 382/199; 700/94; 455/414.1; 370/260; 705/14.5
See application file for complete search history.

(56) References Cited

U.S. PATENT DOCUMENTS

| | | | |
|---|---|---|---|
| 5,873,107 A | 2/1999 | Borovoy et al. | |
| 5,875,231 A | 2/1999 | Farfan et al. | |
| 5,901,209 A * | 5/1999 | Tannenbaum et al. ... | 379/142.09 |
| 6,269,369 B1 | 7/2001 | Robertson | |
| 6,542,739 B1 | 4/2003 | Garner | |
| 6,807,259 B1 * | 10/2004 | Patel et al. .............. | 379/142.01 |
| 6,934,738 B1 | 8/2005 | Furusawa et al. | |
| 7,092,698 B1 | 8/2006 | Sharp et al. | |
| 7,181,017 B1 | 2/2007 | Nagel et al. | |
| 7,225,187 B2 | 5/2007 | Dumais et al. | |
| 7,849,154 B2 | 12/2010 | Grecco et al. | |
| 8,121,897 B2 * | 2/2012 | Shu et al. .................. | 705/14.5 |
| 2001/0005855 A1 * | 6/2001 | Shaw et al. ............... | 709/206 |
| 2001/0032137 A1 * | 10/2001 | Bennett et al. ............ | 705/14 |
| 2002/0054080 A1 | 5/2002 | Belanger et al. | |
| 2002/0136384 A1 | 9/2002 | McCormack et al. | |
| 2002/0172338 A1 * | 11/2002 | Lee et al. .................. | 379/142.01 |
| 2003/0112927 A1 | 6/2003 | Brown et al. | |
| 2003/0143983 A1 | 7/2003 | Crampton | |
| 2004/0002972 A1 | 1/2004 | Pather et al. | |
| 2004/0073607 A1 | 4/2004 | Su et al. | |

(Continued)

FOREIGN PATENT DOCUMENTS

JP      2008176358      7/2008

OTHER PUBLICATIONS

PCT International Search Report (dated Apr. 20, 2009), International Application No. PCT/US2008/014063, International Filing Date—Dec. 23, 2008, (13 pages).

(Continued)

*Primary Examiner* — Jean Gelin
*Assistant Examiner* — Mahendra Patel
(74) *Attorney, Agent, or Firm* — Blakely, Sokoloff, Taylor & Zafman LLP

(57) ABSTRACT

When a communications system initiates a connection, adaptive information can be presented to a user while waiting for that connection to be finalized. The adaptive information that is presented can be selected based on predetermined criteria which can be configured by a user. Moreover, the adaptive information that is presented can be selected based on a characteristic of the connection. For example, adaptive information can be selected which corresponds to the connection endpoint (e.g., the person or place a user is attempting to contact). A system can also delay finalizing a connection in order to present more adaptive information to a user. The delay can last until after all of the adaptive information has been presented or until a unit of adaptive information has been presented.

25 Claims, 8 Drawing Sheets

U.S. PATENT DOCUMENTS

| | | | |
|---|---|---|---|
| 2004/0116183 A1* | 6/2004 | Prindle | 463/42 |
| 2004/0133640 A1 | 7/2004 | Yeager et al. | |
| 2004/0203660 A1 | 10/2004 | Tibrewal et al. | |
| 2004/0215793 A1 | 10/2004 | Ryan et al. | |
| 2004/0236749 A1 | 11/2004 | Cortright et al. | |
| 2004/0249650 A1 | 12/2004 | Freedman et al. | |
| 2005/0021713 A1 | 1/2005 | Dugan et al. | |
| 2005/0043060 A1* | 2/2005 | Brandenberg et al. | 455/558 |
| 2005/0091272 A1 | 4/2005 | Smith et al. | |
| 2005/0111631 A1 | 5/2005 | Jordan, Jr. | |
| 2005/0130631 A1* | 6/2005 | Maguire et al. | 455/414.1 |
| 2005/0147256 A1* | 7/2005 | Peters et al. | 381/56 |
| 2005/0201531 A1 | 9/2005 | Kanter et al. | |
| 2005/0249345 A1 | 11/2005 | Burg et al. | |
| 2005/0286691 A1* | 12/2005 | Taylor et al. | 379/114.03 |
| 2006/0003783 A1 | 1/2006 | Fukui et al. | |
| 2007/0049335 A1 | 3/2007 | Haitani et al. | |
| 2007/0100698 A1* | 5/2007 | Neiman et al. | 705/14 |
| 2007/0192467 A1* | 8/2007 | Keeler | 709/223 |
| 2007/0206566 A1* | 9/2007 | Bennett | 370/352 |
| 2007/0210908 A1 | 9/2007 | Putterman | |
| 2007/0250581 A1 | 10/2007 | Patel et al. | |
| 2008/0086431 A1 | 4/2008 | Robinson et al. | |
| 2008/0254773 A1 | 10/2008 | Lee | |
| 2008/0254774 A1 | 10/2008 | Lee | |
| 2009/0002127 A1 | 1/2009 | Kraft et al. | |
| 2009/0055220 A1 | 2/2009 | Rapaport et al. | |
| 2009/0109957 A1* | 4/2009 | Caradec et al. | 370/352 |
| 2009/0177617 A1 | 7/2009 | Lee | |
| 2009/0262668 A1* | 10/2009 | Hemar et al. | 370/260 |

OTHER PUBLICATIONS

Non-Final Office Action (dated Mar. 10, 2010), U.S. Appl. No. 12/006,695, filed Jan. 3, 2008, First Named Inventor: Michael M. Lee, (16 pages).

Final Office Action (dated Aug. 23, 2010), U.S. Appl. No. 12/006,695, filed Jan. 3, 2008, First Named Inventor: Michael M. Lee, (14 pages).

Non-Final Office Action (dated Nov. 9, 2010), U.S. Appl. No. 12/006,695, filed Jan. 3, 2008, First Named Inventor: Michael M. Lee, (16 pages).

Final Office Action (dated Apr. 15, 2011), U.S. Appl. No. 12/006,695, filed Jan. 3, 2008, First Named Inventor: Michael M. Lee, (16 pages).

Non-Final Office Action (dated Feb. 22, 2012), U.S. Appl. No. 13/297,954, filed Nov. 16, 2011, First Named Inventor: Michael M. Lee, 18 pages.

Non-Final Office Action (dated Mar. 9, 2012), U.S. Appl. No. 12/006,695, filed Jan. 3, 2008, First Named Inventor: Michael M. Lee, 17 pages.

Final Office Action (dated Jul. 12, 2012), U.S. Appl. No. 13/297,954, filed Nov. 16, 2011, First Named Inventor: Michael M. Lee, 20 pages.

* cited by examiner

METHOD FOR AUTOMATIC PRESENTATION OF INFORMATION BEFORE CONNECTION

BACKGROUND OF THE INVENTION

In one embodiment, the present invention can relate to communications systems.

Communications systems typically require time to establish a connection between two devices. For example, there is typically a noticeable delay when placing calls to/from cellular telephones. This delay can be a result of, for example, the time required to make resources (e.g., routers, switches, transmission lines) available for the connection. The user interfaces of traditional communications systems are idle during this time, and a user ends up wasting time waiting for the system to establish a connection. Therefore, there is a need to provide improved communications systems and methods.

SUMMARY OF THE INVENTION

Systems and methods for presenting information are provided. When a communications system initiates a connection, information can be presented to a user while waiting for that connection to be finalized. For example, telecommunications systems can present adaptive information to a user placing a call during the unused time that a call is being routed through the system and ringing at the endpoint. The adaptive information that is presented can be selected based on predetermined criteria which can be configured by a user.

Adaptive information, as defined herein, can refer to information, presented to a user in accordance with embodiments of the invention, that is dynamic with respect to a communications event. The information is adaptive in that it can be automatically presented at times when the user may otherwise not expect to be presented with information. Adaptive information can be different from traditional static information, which is information that remains fixed or the same (e.g., length of call, name of endpoint, and displayed graphic) every time a connection is formed or attempted to be formed with an endpoint. The content of the adaptive information may be specifically tailored to the communications event based on one or more different criteria such as the endpoint, date, time, user's schedule, user's or endpoint's location, and other suitable criteria. Adaptive information can include a user's calendar, past communications between a user and a particular endpoint, advertisements, news, weather, or music. Adaptive information may not necessarily be stored on a user's device. Adaptive information may be stored on a network server or other suitable location and accessed in response to a connection event. Adaptive information may be referred to herein as selected information, presented information, or dynamic information.

The present invention can be incorporated into many types of communications systems (e.g., conventional telephone systems, cellular telephone systems, VOIP telephone systems, videoconferencing systems, radio communications systems). For example, cellular telephone systems can present adaptive information during the time that the system is finalizing a connection (e.g., a call). Videoconferencing systems are another example of a type of communications system which can incorporate the principles of the present invention.

In order to present more adaptive information to a user, a system can delay finalizing a connection. In such a case, the system can begin forming the connection, but not finalize it until a certain amount of adaptive information has been presented to the user. For example, a telecommunications system can plan and route a call but not begin to ring at the endpoint until a certain amount of adaptive information has been presented to a user at the origin. A communications system can be configured to selectively delay finalizing a connection depending on the endpoint of the connection or the selected information.

A user can configure the criteria that a system uses to select the adaptive information that will be presented. When setting up a device, a user can create a profile which determines the type and quantity of adaptive information that a system will present before a connection is finalized. For example, a possible user profile can include presenting all adaptive information about a person that a user is attempting to contact, even if this requires a delay in finalizing the connection. Another possible user profile can include presenting any adaptive information that is relevant to both a person that a user is attempting to contact and an upcoming event on the user's calendar, but without causing a delay in the connection.

In one embodiment, presented information can be selected according to a characteristic of the connection. For example, a system can present adaptive information to a user about someone that they are attempting to contact (by associating the connection endpoint with a person or place). Such adaptive information can include, for example, the name of the person's spouse and children, the date of their birthday or their hobbies. The presented information can be related to previous communications with the person that a user is attempting to contact. For example, as a user is attempting to contact someone, a communications system can present adaptive information about the last time the user communicated with that person. A system can also identify any unsuccessful attempts to communicate (e.g., unanswered calls, voicemails, unread emails) with another person and present a user with adaptive information related to those attempts. This presented information can prepare a user for the upcoming communication.

The adaptive information can be selected based on a user's calendar. For example, a communications system can remind a user about any upcoming events (e.g., birthdays, doctor appointments) on their calendar. The adaptive information can be selected according to both a user's calendar and the person that the user is attempting to contact. For example, a communications system can check a user's calendar for any upcoming events (e.g., meetings, birthdays, children's birthdays) which are related to a person that the user is attempting to contact.

The time that a connection is initiated can affect how the adaptive information is selected. For example, if a user initiates a connection early in the morning, the presented information can be a highlight of the events on the user's calendar for that day. Moreover, if the connection is initiated late in the evening, the presented information can be a summary of the day's news or a summary of events scheduled for the next day.

The adaptive information can be selected based on location. In one embodiment, the presented information can be related to the location of a user at the origin of a connection. For example, if a user is in an area under a severe weather alert, the system can present the weather alert to the user before finalizing a connection. In another embodiment, the presented information can be related to the location of the endpoint of a connection. For example, if a user is attempting to contact a person who is out of the country, a system can notify the user about that. In yet another embodiment, the presented information can be related to the location of both the origin and endpoint of a connection. For example, a system can notify a user if the endpoint is within a certain proximity to the origin.

Additionally, communications systems can present general adaptive information that is independent of any characteristics of the connection. For example, a communications system can be configured to present national or global news headlines when a connection is being established. Music is another example of adaptive information that can be independent of the connection.

Communications systems can present adaptive information as an advertisement to a user while the user is waiting for a connection to be established. Advertisement space can be sold by system operators and the advertising revenue may be used to lower or eliminate costs incurred by a user.

Adaptive information that is presented to a user can originate from a device other than a local device at the origin of the connection. For example, a local device can initiate a connection, receive adaptive information from another device (e.g., a server), and then present that adaptive information to a user. This architecture can simplify the amount of information that is stored on the local device.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

Commonly assigned Lee U.S. patent application Ser, No. 11/787,156, filed Apr. 12, 2007, entitled "COMMUNICATIONS SYSTEM THAT PROVIDES USER-SELECTABLE DATA WHEN USER IS ON-HOLD" is hereby incorporated by reference in its entirety.

In the discussion below, the terms connection, origin and endpoint are used with respect to communications systems. The word connection is used to define any link within a communications system that can transmit data. Each connection can have an origin and an endpoint. The term origin is used to define the part of a system where a connection is initiated, and the part of a system that connects with the origin is referred to as an endpoint. In the exemplary analogy of a telecommunications system: a call is a connection, a telephone placing a call is an origin and a telephone receiving a call is an endpoint.

The terms connection event, initiate and finalize are used in the present application to define the process of forming a connection. A connection event can relate to the formation of a connection (e.g., placing a call). A connection event is initiated when the formation of the connection begins (e.g., dialing a telephone number). The connection event is finalized once it is fully formed (e.g., a telephone call is picked up)

Figure 1:
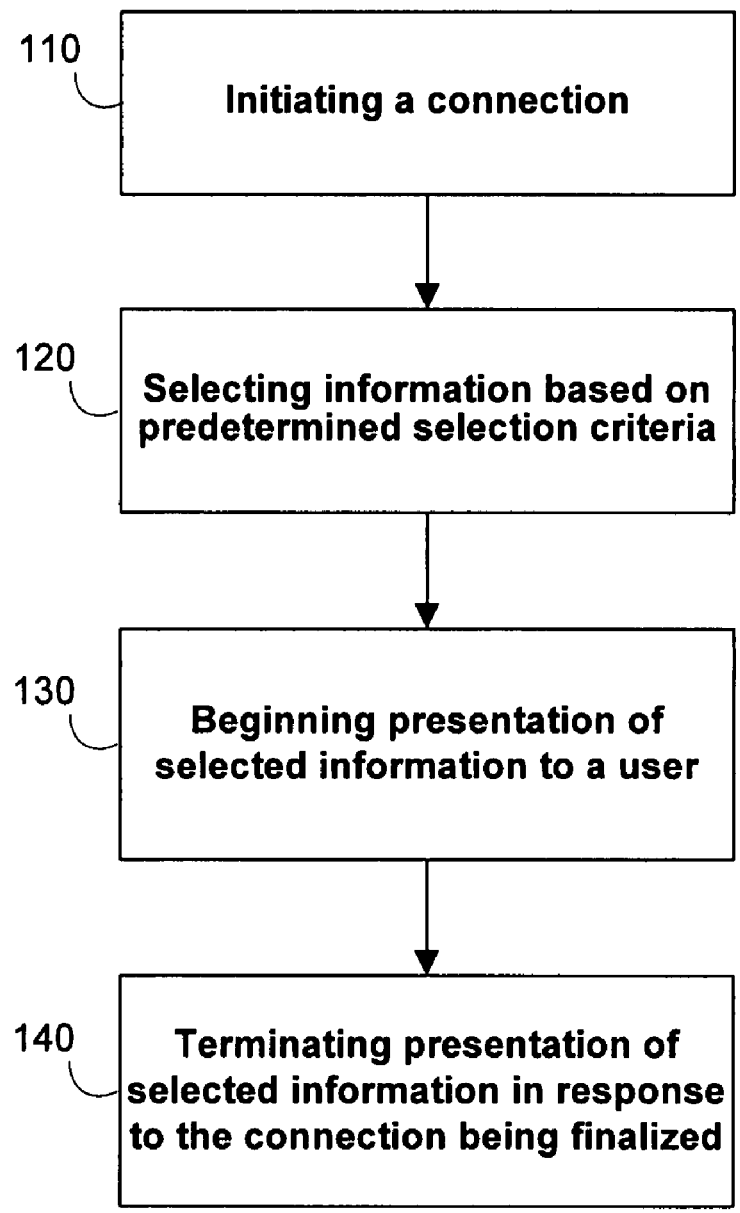
FIG. 1 is a flowchart of an illustrative process for presenting adaptive information in accordance with an embodiment of the present invention.

FIG. 1 shows a flowchart of method 100 for presenting adaptive information to a user of a communications system in accordance with an embodiment of the present invention. At step 110, a connection can be initiated. The connection can be between two devices in a communications system. One device can be the origin of the connection, and the other device can be the endpoint. Initiating the connection can occur in response to a user's actions. For example, a user can input a command into a device which initiates the connection with another device. Alternatively, initiating the connection can occur automatically in response to an internal command within the system. Initiating a connection can, for example, include a user inputting a command into the system or a communications system configuring itself to connect an origin and an endpoint. Initiating a connection can include any of the activities associated with creating a connection, up to the point of finalizing the connection event.

At step 120, adaptive information can be selected based on predetermined selection criteria. How adaptive information is selected can vary depending on many criteria, including characteristics or aspects of the connection. For example, adaptive information can be selected according to who/what a user is attempting to establish a connection with. In order to identify who/what a user is attempting to connect with, a system can affiliate different endpoints with different identities (e.g., people or places). This can be done automatically using information such as publicly available directory listings. Alternatively, endpoints can be manually affiliated with people and places through user input.

The predetermined criteria used to select adaptive information can be chosen by a user when configuring a device. A detailed description of possible criteria used to select adaptive information can be found below in the discussion relating to FIGS. 3 and 4A-4D. If no selection criteria has been previously chosen, a default criteria can be used to select adaptive information.

Alternatively, a communications system can prompt a user to select what adaptive information to present. Rather than automatically selecting adaptive information according to predetermined criteria, the system can prompt a user about what adaptive information the user would like. The prompt can be either a verbal or graphical prompt, and the user can respond through a suitable input device (e.g., button or voice recognition system).

At step 130, the presentation of selected information to a user can begin. Selected information can be presented using, for example, audio or graphical representations of the adaptive information. In one embodiment, adaptive information stored as symbols (e.g., numbers, letters, words) can be converted to audio signals (e.g., using a voice emulation algorithm) and played through one or more speakers. In an alternative embodiment, adaptive information can be stored as audio signals which are accessed and played through one or more speakers.

Adaptive information can also be presented using graphical representations. Graphical representations of adaptive information can be used separately from or in combination with audio signals. For example, a device can display a picture of the person a user is attempting to contact while also providing important facts about that person through an audio signal.

At step 140, the presentation of selected information can be terminated in response to the connection being formed. One or more indicators can be used to determine when a connection has been formed. For example, a connection can be considered formed once the necessary system resources have been reserved to facilitate the connection. Another indication of a connection being formed can be when a path between two devices in the system has been chosen. Further yet, a connection can be considered formed when two ends of the connection are ready to begin communicating. For example, a telephone call can be considered formed once the call is answered. In this example, the time that the receiving telephone is ringing can be used to present adaptive information. In an alternative example, a telephone call can be considered formed once the call begins ringing, and the presentation of adaptive information can be terminated at this time. It is understood that many communications systems use different procedures to establish connections. Each of these different procedures can include various monitorable events. In accordance with embodiments of the present invention, any of these monitorable events can be used to determine when a connection has been formed.

In one embodiment, the presentation of adaptive information can be instantly terminated when the connection has been formed. Such an instant termination can be followed by, for example, an immediate switch to presenting data from the connection. For example, a cellular telephone can switch immediately from the presentation of adaptive information to a call that is ringing on the other end.

In other embodiments, a communications system can notify a user that it is terminating the presentation of adaptive information and switching to the connection. Such a notification can, for example, be an audio signal (e.g., beep, tone, pre-recorded or emulated voice), a graphical signal (e.g., text, an icon, an indicator light) or a tactile signal (e.g., device vibrations). A communications system can also selectively terminate the presentation of adaptive information depending on the situation. For example, if a telephone call is answered the system may immediately switch to the call, but if the telephone call reaches a voicemail system the system may ask the user how to proceed.

Figure 2:
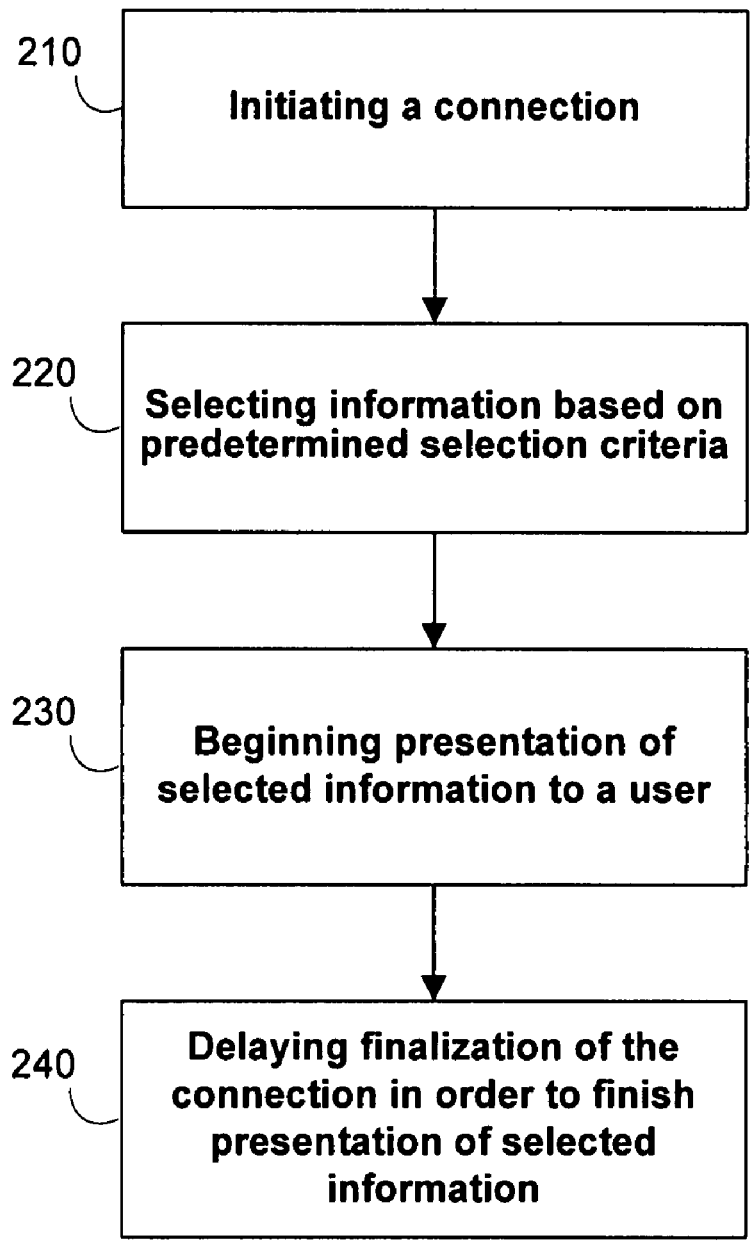
FIG. 2 is a flowchart of another illustrative process for presenting adaptive information in accordance with an embodiment of the present invention.

FIG. 2 shows a flowchart of method 200 for presenting adaptive information to a user of a communications system in accordance with an embodiment of the present invention. With respect to method 100, method 200 is primarily different in that the formation of a connection can be delayed in order to present all of the selected information. For example, a cellular telephone system may delay the finalization of a call in order to finish presenting all of the adaptive information about the person a user is calling. Otherwise, method 200 is similar to method 100 in many aspects, and the descriptions of steps 110, 120 and 130 can be applied, respectively, to steps 210, 220 and 230.

At step 210, a connection can be initiated. In addition to what is described in connection with step 110, step 210 can include transmitting a notice that the formation of the connection may be delayed in order to finish presenting adaptive information. A communications system can use this notice to identify which connections may be delayed and to configure itself accordingly. In cases where there is a substantial amount of adaptive information to be presented, a communications device may not notify other parts of the communications system about the connection until after it has presented at least a portion of the adaptive information.

At step 220, adaptive information can be selected based on predetermined selection criteria. Similar to adaptive information described above in connection with step 120, the adaptive information selected in step 220 can be based on a characteristic of the connection (e.g., the person a user is attempting to contact, a user's location, a user's local time) or any other suitable criteria.

At step 230, the presentation of selected information to a user can begin. As discussed in the above description of step 130, there are various ways that adaptive information can be presented to a user.

At step 240, the formation of the connection can be delayed in order to finish presenting the selected information. The delay can occur at any time during the process of forming the connection. For example, in cellular telephone systems, a connection can be formed up to the point where a call is about to ring, and the call can be delayed in order to finish presenting adaptive information. In one embodiment, the delay can last until the communications system has presented all of the selected information. In another embodiment, the delay can last until after the presentation of a unit of data (e.g., a word, a complete news article, a description of an upcoming event on a user's calendar). In this embodiment, the presentation of data can be selectively terminated in a way that does not cut-off part of a data unit. For example, if a communications system has presented all of the adaptive information relating to a first upcoming event on a user's calendar, it may then finalize the connection event instead of presenting adaptive information about a second upcoming event on the user's calendar.

Moreover, a communications system can use multiple delay periods during the presentation of adaptive information. For example, a communications system can form a first part of a connection, delay for a period of time, form a second part of a connection, delay for a period of time and so on until the connection is fully formed. The amount of each delay can be dynamically selected as the connection is being formed. The amount of each delay may be selected so that the sum of all of the delays is the amount of time required to present all or a certain portion of the adaptive information.

It is understood that a user can manually override any delay in the formation of a connection. For example, a communications system can include an input (e.g., button, voice-command) that a user may select in order to stop any delay. If such an input is selected, a communications system can immediately switch to presenting data from the connection.

Alternatively, it is also understood that a user can manually create a delay in the formation of a connection. A user can choose to extend a delay in order to receive more adaptive information. A user may be able to manually delay the formation of a connection by providing an input to a user interface (e.g., a button or a touch-screen). While information is being presented, a user can provide an input that instructs a system to delay the formation of a connection so that a unit (e.g., word, sentence, intelligible block) of adaptive information can be presented. A user can also delay the formation of a connection indefinitely. For example, if the adaptive information causes a user to change his or her mind about contacting someone, the user may manually delay the connection indefinitely. In such a case, the system may abandon the formation of the connection. A system may also configure itself to remind the user about the abandoned connection at some later time, for example, when the user may have changed his or her mind.

Figure 3:
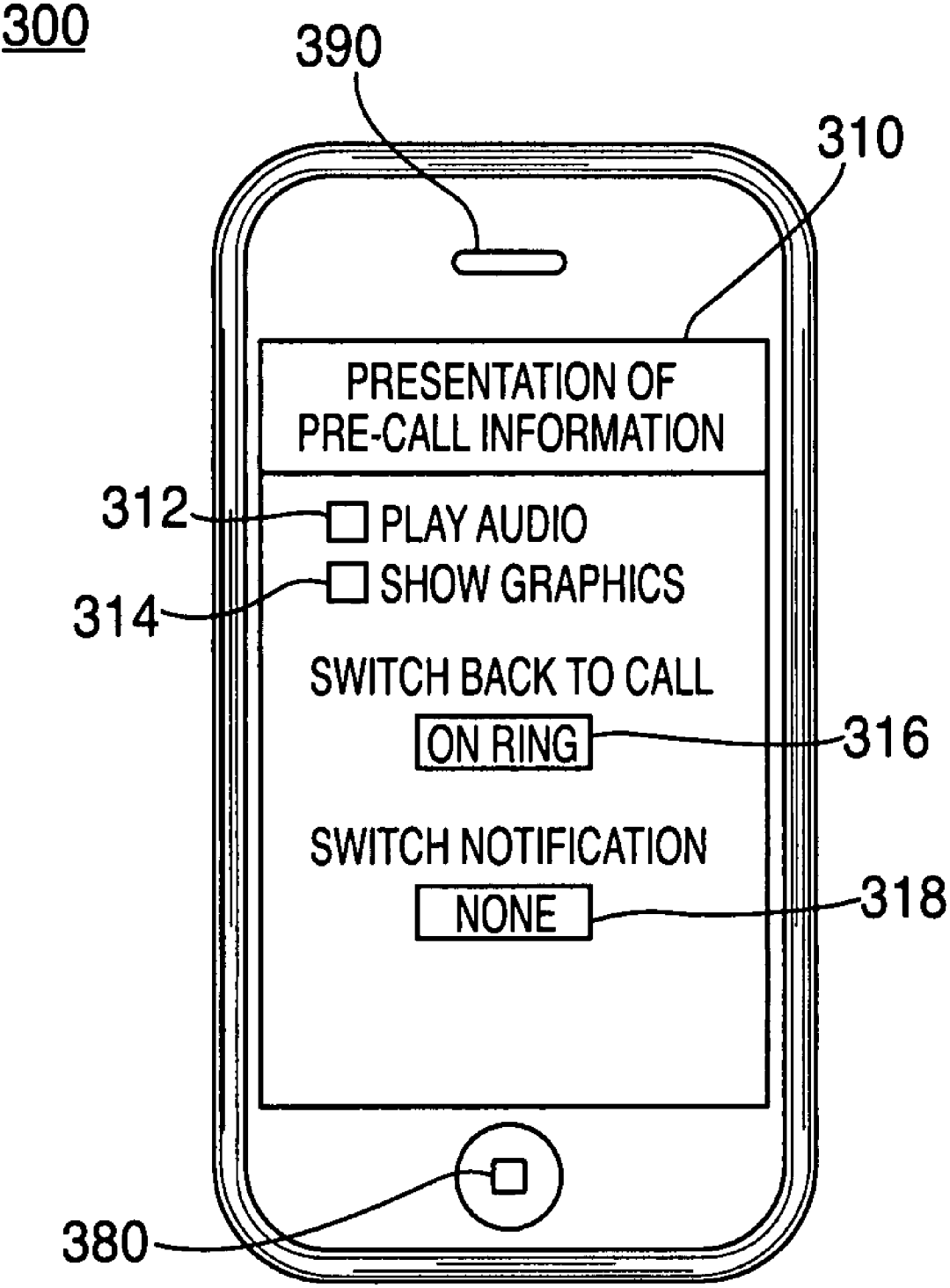
FIG. 3 is a simplified illustration of a screenshot of a communications device in accordance with an embodiment of the present invention.

FIG. 3 includes a sample screenshot of a user interface of device 300 that is part of a communications system. In one embodiment, device 300 can be a cellular telephone that is part of a cellular telephone system. In other embodiments, device 300 can be any other type of communications device (e.g., computer or radio) that is part of a communications system (e.g., the internet or a network of devices).

The user interface of device 300 can be operable to configure the presentation of adaptive information to a user while a connection (e.g., a telephone call) is being formed. Device 300 can include screen 310 which can be a touch-screen that is operable to both display adaptive information and receive user input. Although device 300 is shown with a touch-screen, it is understood that other input devices can be used without deviating from the spirit of the present invention. Device 300 can also include speaker 390 which can generate audio signals to output adaptive information to a user and microphone 380 which can receive audio input from a user.

Screen 310 can include inputs 312, 314, 316 and 318 which a user can set according to their preferences. Input 312 can be a checkbox that determines whether adaptive information is audibly presented to a user when a connection is being formed. Input 314 can be a checkbox that determines whether adaptive information is graphically displayed while a connection is being formed. Both inputs 312 and 314 can be selected at the same time. In this case, a user may receive adaptive information both audibly and graphically while waiting for a connection to be formed. In one embodiment, the adaptive information that is presented audibly can be different from the adaptive information that is presented graphically. For example, a graphical display may present a weather forecast while news headlines are presented audibly. In other embodiments, the audio and graphical signals can be redundant. For example, a list of news headlines can be presented using both graphical and audio signals.

Inputs 316 and 318 can be used to configure when and how a system changes from presenting adaptive information to a connection. Input 316 can be set to control when a system stops presenting adaptive information and begins presenting data from a connection. Input 316 can control whether or not the system delays the formation of a connection in order to present more adaptive information. For example, input 316 can be set so that a communications system stops presenting adaptive information when it attempts to contact a party on the other end of a connection (e.g., when a telephone call begins ringing). Alternatively, input 316 can be set so that a communications system stops presenting adaptive information when it reaches a party on the other end of a connection (e.g., when someone answers a telephone call). In order to configure a communications system to present more adaptive information by delaying the formation of a connection, input 316 can be set so that the system finalizes a connection event after all of the selected information has been presented. Input 316 can be set so that the system delays finalizing the connection event until after a predetermined unit of adaptive information has been presented. A predetermined unit can be, for example, the adaptive information that makes up an intelligible unit (e.g., a complete news headline, a complete summary of an upcoming event). Alternatively, input 316 can be set so that the system delays finalizing a connection event until a predetermined amount of time has elapsed. In this embodiment, a system can present as much adaptive information as possible during this predetermined amount of time.

Input 318 can be set to configure a communications system to notify a user when it switches from presenting adaptive information to a connection. Input 318 can, for example, be set to notify a user with a beep, a voice message or by vibrating a communications device. Alternatively, input 318 can be set to provide no notification at all.

FIGS. 4A-4D include sample screenshots of user interfaces of device 400. Device 400 can be part of a communications system that is operable to present adaptive information to a user in accordance with an embodiment of the present invention. In one embodiment, device 400 can be a cellular telephone that is part of a cellular telephone system. In other embodiments, device 400 can be any other type of communications device (e.g., computer or radio) that is part of a communications system (e.g., the internet or a network of devices).

The user interface of device 400 can be operable to configure the criteria used to select adaptive information which can be presented to a user while a connection (e.g., a telephone call) is being formed. Device 400 can include screen 410 which can be a touch-screen that is operable to both display adaptive information and receive user input. Although device 400 is shown with a touch-screen, it is understood that other input devices can be used without deviating from the spirit of the present invention. Device 400 can also include speaker 490 which can generate audio signals to output adaptive information to a user and microphone 480 which can receive audio input from a user.

Figure 4A:
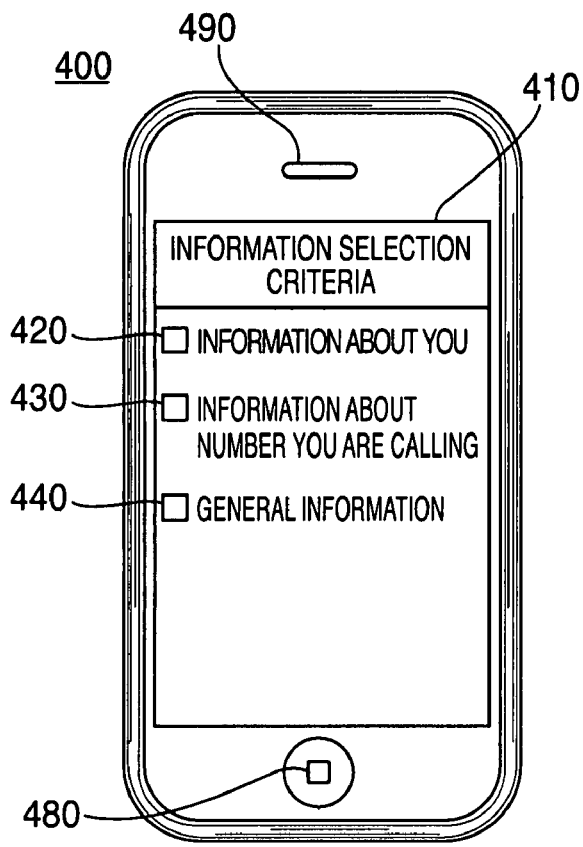
FIGS. 4A-4D are simplified illustrations of other screenshots of a communications device in accordance with an embodiment of the present invention.

FIG. 4A includes a screenshot of a user interface that can be used to select exemplary categories 420, 430 and 440 of adaptive information. The interface shown in FIG. 4A can allow a user to select different categories and navigate between the options within each category. In addition to navigating the categories, the interface shown in FIG. 4A can be used to rank each category with respect to the other categories. For example, the categories can be ranked by assigning them numbers indicative of their importance or by reordering the list in order of importance.

Figure 4B:
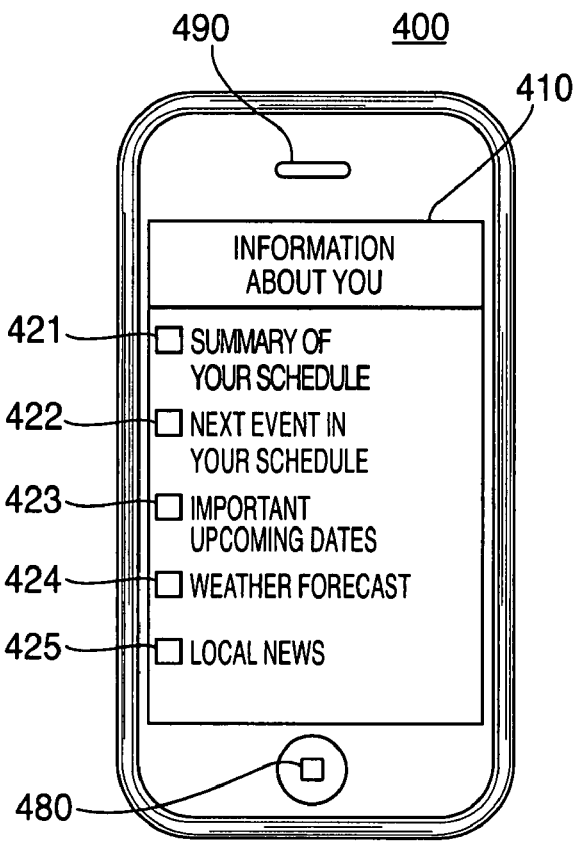

Category 420 can correspond to types of adaptive information that are based on the origin of a connection or a user at the origin (e.g., a user placing a call). FIG. 4B includes a screenshot of a user interface that can correspond to category 420 and includes, for example, inputs 421, 422, 423, 424 and 425. Input 421 can be used to select a summary of a user's calendar over a predetermined amount of time. Input 422 can be used to select a detailed description of the next event on a user's calendar. Input 423 can be used to select important upcoming dates (e.g., spouse's and children's birthday, anniversaries and deadlines). Input 424 can be used to select the weather forecast in a user's area. Input 425 can be used to select local news for a user's area.

Figure 4C:
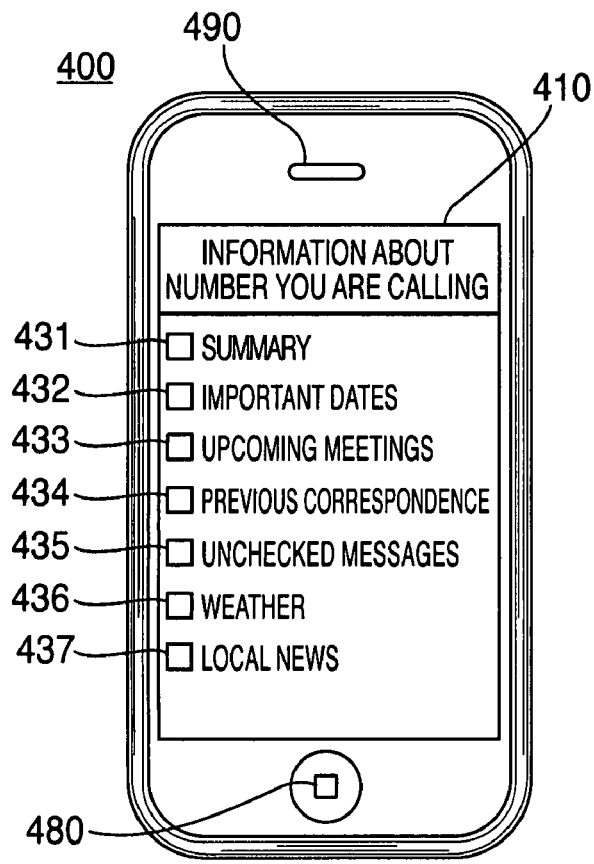

Category 430 can correspond to types of adaptive information that are based on the endpoint of a connection (e.g., the number that the user is calling, a person associated with that number). FIG. 4C includes a screenshot of a user interface that can correspond to category 430 and includes, for example, inputs 431, 432, 433, 434, 435, 436 and 437. Input 431 can be used to select a summary of adaptive information about the endpoint of a connection. Input 432 can be used to select upcoming dates on a user's calendar which involve the endpoint of a connection. Input 433 can be used to select upcoming events or meetings on a user's calendar which include the endpoint of a connection. Input 434 can be used to select adaptive information about previous communications between a user and the endpoint of a connection. Input 435 can be used to select unchecked messages or data that a user may have received from the endpoint of a connection. Input 436 can be used to select weather conditions (current or forecasted) at the endpoint of a connection. Input 437 can be used to select local news at the endpoint of a connection.

Figure 4D:
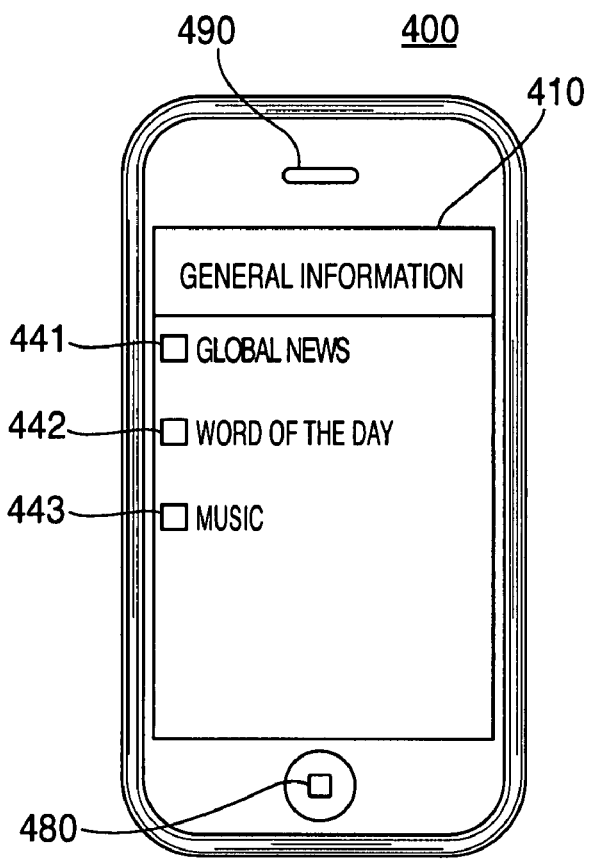

Category 440 can correspond to types of general adaptive information (e.g., global news). Such general adaptive information can be independent of a connection's origin or endpoint. FIG. 4D includes a screenshot of a user interface that can correspond to category 440 and includes, for example, inputs 441, 442 and 443. Input 441 can be used to select global news. Input 442 can be used to select a "word of the day" or other similar adaptive information. Input 443 can be used to select music. It is understood that there are many types of general adaptive information that a user can select from and that inputs more detailed than those shown in FIG. 4D can be used. For example, a user can choose specific collections of music that may be based on artist, genre or play list.

It is also understood that, in some embodiments, music and news can be adaptive information that is dependent of one or more characteristics of a connection being formed. For example, a communications system can be configured to present news based on a user's location or the endpoint's location. In another example, a communications system can be configured to present music based on the endpoint.

The types of adaptive information described above are examples of information that can be presented while a connection is being formed. It is understood that other types of information can be presented without deviating from the spirit of the present invention.

Each of the inputs shown in FIGS. 4B-4D can be selected to indicate that a communications system should include that type of adaptive information in the selection criteria. Such a selection scheme can be implemented by, for example, placing user configurable check-boxes in front of each input. In another embodiment, a user can assign a ranking to each of the inputs shown in FIGS. 4B-4D. This can be implemented by allowing a user to, for example, assign a rank number to each input or reorder the list of adaptive information according to importance. A user can also assign rankings to the different categories 420, 430 and 440 of adaptive information shown in FIG. 4A. A communications system can use these rankings to determine the order to present adaptive information.

In addition to a user's ranking of importance, there are many additional factors which a communications system can use to select what adaptive information to present. The time when a connection is initiated can affect what adaptive information is selected. For example, a connection which is initiated early in the morning can be accompanied by a summary of a user's calendar for that day. The time at the endpoint of a connection can also have an effect. For example, if a communications system is creating a connection between two time zones, the system can notify a user at the origin what the local time at the endpoint of the connection is.

Location can also be a factor in what adaptive information a communications system selects to present to a user. The location of a user at the origin of a connection can be used to convey relevant adaptive information which is specific to that location. For example, a communications system can present local news and weather to a user. The location of the endpoint of a connection can also be used to select what adaptive information is presented. For example, it can be advantageous for a user at the origin to know what the local news and weather is at the endpoint of the connection.

Communications systems can also keep a log of what adaptive information has already been presented to a user and when it was presented. This data can be used so that a system does not present redundant information to a user within a short period of time. For example, a communications system may be configured to never present the same piece of adaptive information twice within a single week. This log can also be used so that each successive connection to the same endpoint leads to increasingly more detailed adaptive information.

A communications system can select adaptive information differently when connecting with specially identified endpoints. A user can identify specific endpoints and define different selection criteria to use when connecting with those endpoints. For example, a user can identify all of the connection endpoints that are associated with their family and configure a system to only present adaptive information about upcoming birthdays when connecting with those endpoints. Continuing the example, if there is no information about an upcoming birthday related to an endpoint that a user is attempting to contact, the system can present general adaptive information such as news.

In accordance with an embodiment of the present invention, a communications system can present advertisements before finalizing a connection event. In the present application, the term advertisement is used to define any media which may be used for promoting a product or service. Advertisements can include audio signals, images, videos or a combination of the three formats. Advertisements can be sold to create income for the operator of the communications system. In order to target more promising potential customers, advertisements can be selected based on a variety of factors as described below. These types of targeted advertisements may be more desirable than generic advertising.

Advertisements can be selected for presentation according to a characteristic of the connection. Advertisement selection can be based on the person or place that a user is attempting to connect with. For example, if a user is attempting to connect with a place that sells a certain type of product, a system can present an advertisement for another place that sells the same type of product.

Advertisement selection can also be based on a user's location. Advertisements can be selected based on, for example, nearby businesses, the weather at the user's location or local news for the user's location. For example, a system can present advertisements for businesses that are located near a user.

Advertisements can also be selected according to a user's previous activities. By analyzing a user's past actions, a system can select advertisements which are likely to be relevant to a user and the types of products they buy. Systems can present certain advertisements to only the users which fulfill a predetermined criteria for that advertisement.

A communications system can delay the finalization of a connection event so that a complete advertisement can be presented without being cut-off. A system can be configured so that a user cannot manually override the delay in order to skip an advertisement. If a system is configured in this manner, a system can guarantee that advertisements can not be manually overridden, thereby potentially making the advertisements more valuable.

A system can keep a log of which advertisements have been presented to which users. This log can be used to sell advertisements according to the number of views. Additionally, this log can be used to determine how many advertisements have been presented to a user, and a system can grant that user credits which can be used to lower costs incurred by the user.

The adaptive information presented by a communications system can be stored anywhere in that system. In one embodiment, adaptive information can be stored in the local device that originated a connection and presented to a user directly from that device. Alternatively, adaptive information can be stored in a central device which is part of the communications system. Such a central device can share the adaptive information with local devices when requested to. It can be advantageous to store any redundant information on a central device in order to minimize redundant storage in a system. Therefore, a combination of storage locations can be used to store the adaptive information that is presented to a user. For example, general adaptive information (e.g., news, weather forecasts) that isn't user-specific can be stored on a central device (e.g., a server) while user-specific adaptive information (e.g., a user's calendar) can be stored on a local device that is associated with that user. This example shows one way to consolidate information which is common to a majority of users and reduce redundant storage in a system.

The adaptive information presented in accordance with embodiments of the invention is adaptive or dynamic in that it is not limited to being the same information that is repeatedly displayed each time a connection is initiated. This is in contrast to prior art communications systems that display the same graphic, animation sequence, or name of the end point each time a connection is initiated. Embodiments of the present invention go above and beyond such conventional presentations of information. In addition to the embodiments discussed herein, the presented information may be derived from information sources that are not needed by the communications system to conduct a communications event (e.g., a call). For example, the origin may be a device operating with an operating system, which may serve as a "backbone" for supporting applications. One such application (referred to as a communications applications) may be responsible for executing communications events. Another application may include a calendar program. When the communications event is initiated, the communications program can access data from the calendar program (e.g., upcoming meeting information with the endpoint) and present it. This example illustrates that the dynamic information can be cross-application derived information.

As another example, the dynamic information can be cross-platform derived information. That is, the origin device may present adaptive information stored remotely on another device (e.g., a server in communication with the communications system or the endpoint device). The cross-platform adaptive information may be retrieved and presented in real-time in connection with a communication event. In another approach, the cross-platform adaptive information may be retrieved remotely and stored (e.g., either temporarily or permanently) and retrieved from local storage on-demand.

Figure 5:
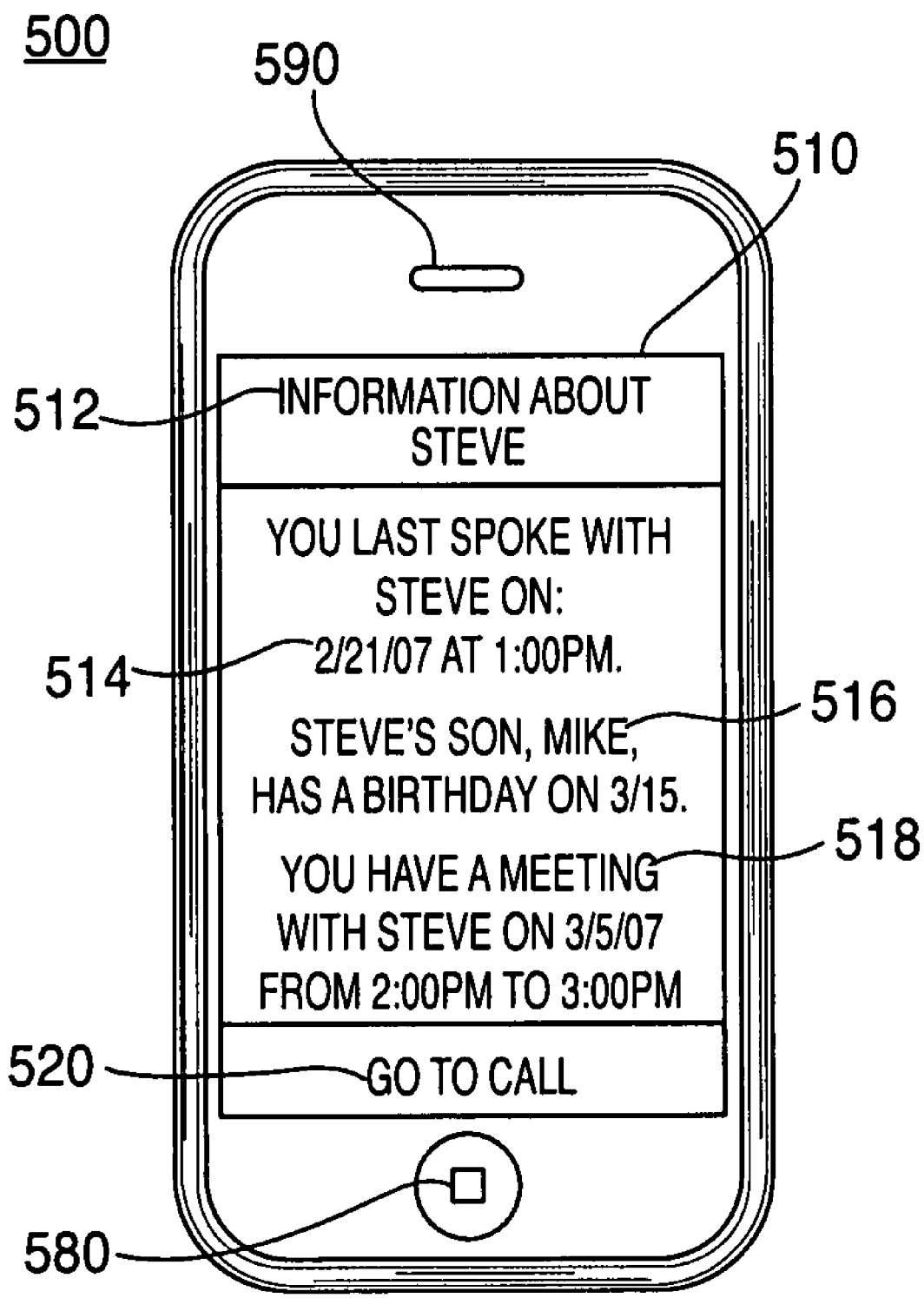
FIG. 5 is a simplified illustration of another screenshot of a communications device in accordance with an embodiment of the present invention.

FIG. 5 includes a sample screenshot of a user interface of device 500 that is part of a communications system. In one embodiment, device 500 can be a cellular telephone that is part of a cellular telephone system. In other embodiments, device 500 can be any other type of communications device (e.g., computer or radio) that is part of a communications system (e.g., the internet or a network of devices).

The user interface of device 500 can be operable to present adaptive information to a user while a connection is being formed. Device 500 can include screen 510 which can be a touch-screen that is operable to both display adaptive information and receive user input. Device 500 can also include speaker 590 which can generate audio signals to output adaptive information to a user and microphone 580 which can receive audio input from a user.

Screen 510 can include outputs 512, 514 and 516 which display adaptive information about an endpoint that a user attempting to connect with while the connection is being formed. Output 512 can include a title of the type of adaptive information screen 510 is displaying. Output 514 can include the time when a user last communicated with the node that they are attempting to connect with. Output 516 can include any upcoming dates which are related to the node that a user is attempting to connect with. Output 518 can include any upcoming events in a user's calendar that are related to the node that a user is attempting to connect with.

While outputs 512, 514 and 516 can graphically display adaptive information to a user, speaker 590 can also audibly provide adaptive information to a user while a connection is being formed. Speaker 590 can emit an audio signal that is related to the adaptive information presented on screen 510. For example, the adaptive information on screen 510 can be processed by a voice-emulation system (not shown) and the resulting audio signal can be emitted from speaker 590. Alternatively, speaker 590 can emit an audio signal that is unrelated to the adaptive information presented on screen 510. For example, speaker 590 can present an audio signal containing the day's news headlines while screen 510 presents adaptive information related to the person that a user is attempting to connect with.

It is understood that additional types of adaptive information which may be different from those shown in FIG. 5 can be presented to a user without deviating from the spirit of the present invention. Moreover, the types of adaptive information shown in FIG. 5 are the result of exemplary selection criteria that can be set using the user interface shown in FIGS. 4A-4D.

Screen 510 can also include input 520 which a user can select to stop any delay in the formation of a connection. In addition to using input 520, a user can speak input commands into microphone 580 to stop the delay of a formation of a connection. A voice-recognition system (not shown) can process user input received from microphone 580.

Figure 6:
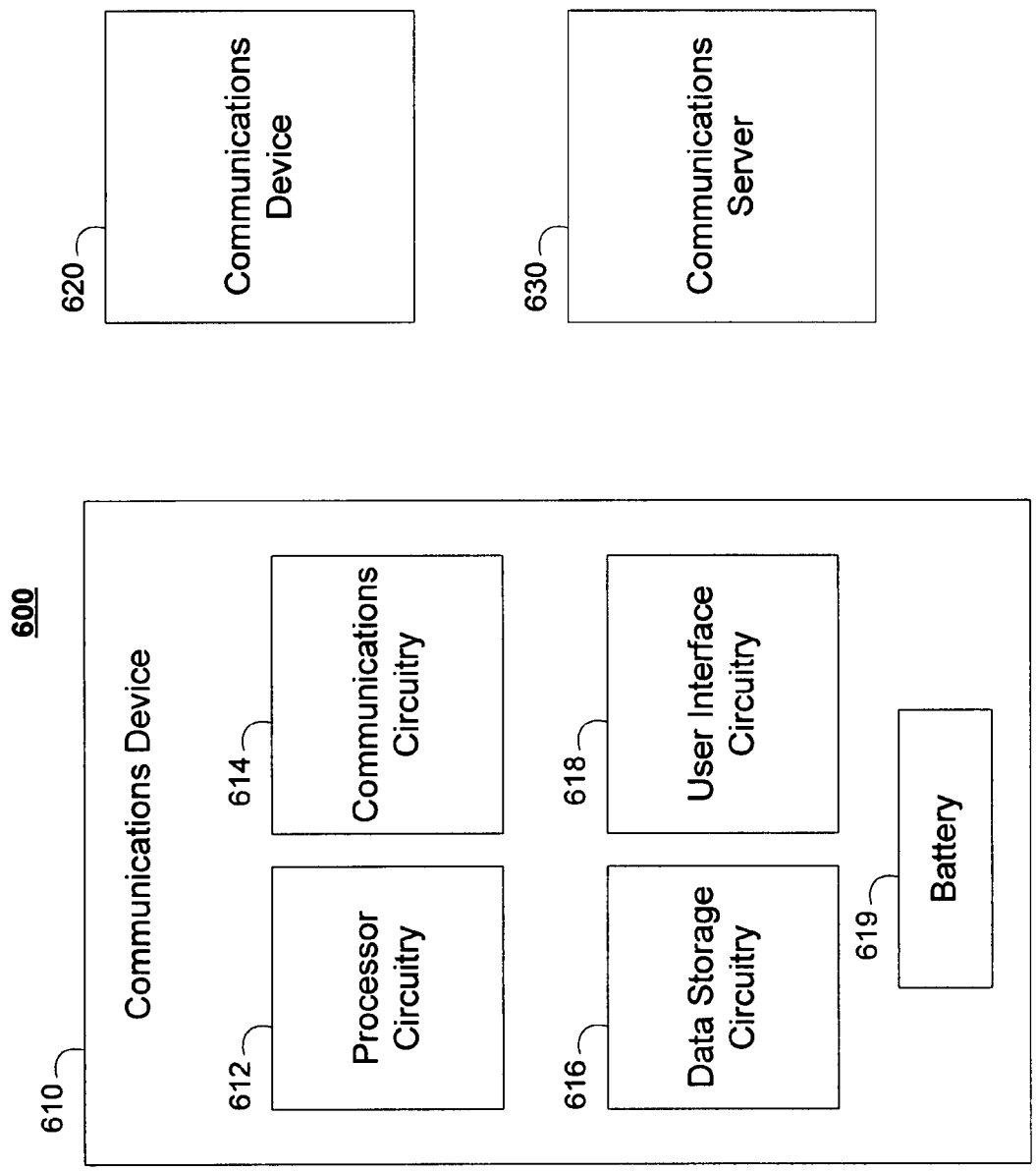
FIG. 6 is a simplified schematic diagram of a communications system in accordance with an embodiment of the present invention.

FIG. 6 includes communications system 600 in accordance with an embodiment of the present invention. System 600 can include local device 610, local device 620 and server 630. Devices 610 and 620 can form connections which allow data to pass between the devices. Devices 610 and 620 can be, for example, cellular telephones or mobile computers. Server 630 can facilitate the connections between local devices 610 and 620. Server 630 can plan and route connections between device 610 and device 620. Server 630 can also store adaptive information that is transmitted to device 610 or device 620 for presentation before a connection. In another embodiment, device 610 can connect directly with device 620 without using server 630. It is understood that system 600 can include more devices and servers in addition to those shown in FIG. 6.

Device 610 can include processor circuitry 612, communications circuitry 614, data storage circuitry 616, user interface 618 and battery 619. Processor circuitry 612 can coordinate the functions of device 610. Processor circuitry 612 can include, for example, an ARM processor. Processor circuitry 612 can be electrical coupled with communications circuitry 614, data storage circuitry 616, user interface circuitry 618 and battery 619.

Communications circuitry 614 can be a system-on-a-chip (SoC) circuit which handles all of the communications device 610 has with device 620 or server 630. Communications circuitry 614 can initiate and finalize connections with other devices. Data storage circuitry 616 can store adaptive information in device 610 and can retrieve stored adaptive information at a later time. Data storage circuitry 616 can include, for example, a magnetic disk or flash memory. Data storage circuitry 616 can also store user inputs regarding selection criteria used to select adaptive information. User interface circuitry 618 can output adaptive information to a user and receive user input. User interface circuitry 618 can include, for example, an audio speaker operable to output sound, a microphone operable to receive user voice inputs and a touch-screen display operable to output graphics and receive user inputs. Alternatively, user interface circuitry 618 can include a display screen operable to output graphics and buttons operable to receive user inputs. Device 620 can be capable of the same functions of device 610 and can include all of the elements shown within device 610.

Figure 7:
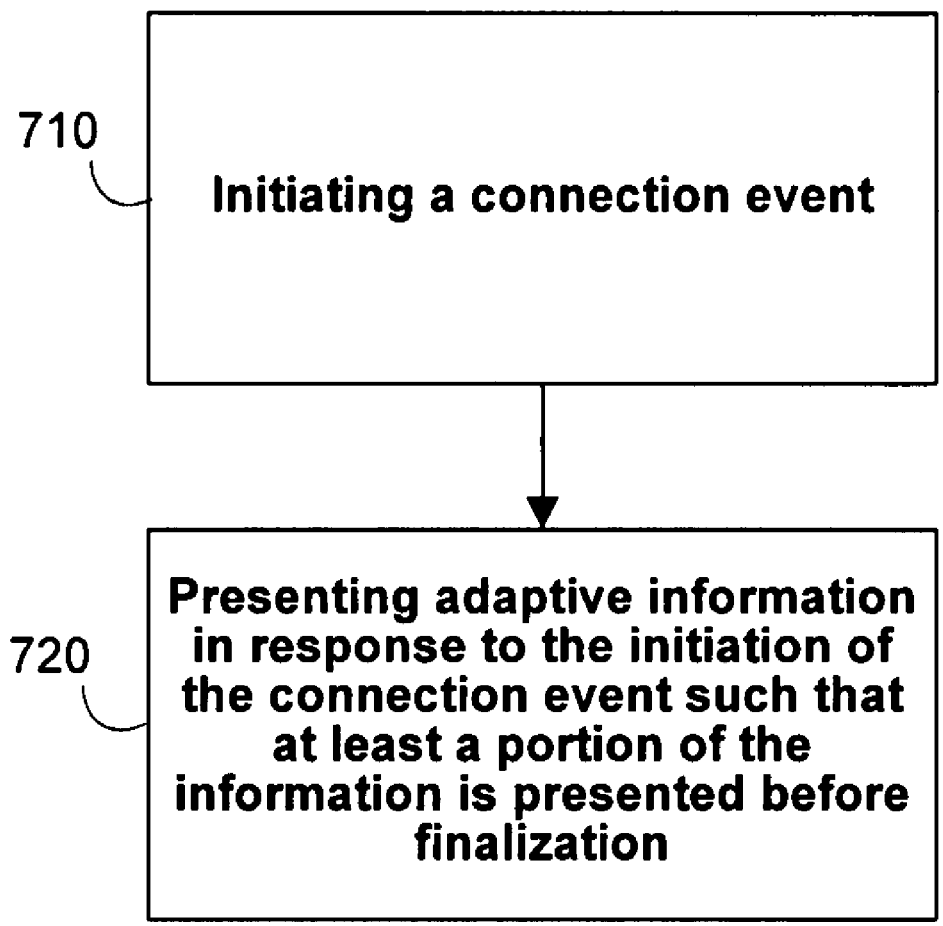
FIG. 7 is a flowchart of another illustrative process for presenting adaptive information in accordance with an embodiment of the present invention.

FIG. 7 shows a flowchart of method 700 for presenting adaptive information during a connection event in accordance with an embodiment of the present invention. At step 710, a connection event can be initiated. In the example of a telecommunications system, initiation of a connection event can include dialing a telephone number. At step 720, adaptive information is presented in response to the initiation of the connection event such that at least a portion of the adaptive information is presented before finalization. The adaptive information can, for example, be presented audibly or graphically. Continuing the example of a telecommunications system, finalization of a connection event can include a call being answered.

It is understood that the principles of the present invention are not limited to the communications systems described in the discussions above and can be applied to any type of communications system or connection.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A method in a first communications device, the method comprising:
    upon receiving a user command, initiating a call to a second communication device of another party to enable a user of the first device to speak to said another party;
    selecting adaptive information that is related to an identification of said another party, in response to the user command;
    presenting the adaptive information such that at least a portion of the adaptive information is presented to the user in the first device before finalization of the call to said another party;
    wherein the adaptive information includes one of (a) information about the last time the user communicated with said another party and (b) information about unsuccessful attempts to communicate, including one of (i) unanswered calls, (ii) voicemails, (iii) unread emails, and (iv) unchecked messages; and
    the presenting of adaptive information is ended upon the finalization of the call, wherein the finalization is defined by a monitorable event that can be configured by the user, through system-presented options, as being (a) ringing of the second device of another party and (b) answering of the second device by another party.

2. The method of claim 1, wherein initiating the call comprises connecting two or more devices.

3. The method of claim 1, wherein the adaptive information content is selected based on criteria configured by the user.

4. The method of claim 1, wherein the adaptive information content is selected according to one of a characteristic of the connection, a user's location, a user's calendar, the time that a connection is initiated, and a user's previous activities.

5. The method of claim 1, further comprising notifying the user of the first communications device prior to ending the presentation of the adaptive information.

6. The method of claim 1, wherein ending the presentation of the adaptive information occurs without notifying the user.

7. The method of claim 1, wherein the adaptive information further includes information from one of (a) news, (b) weather, (c) music, (d) calendar events, and (e) advertisements that are selected according to one of a characteristic of the call's connection and the user's previous activities.

8. The method of claim 7, wherein the information from calendar events is selected according to one of (a) a user's calendar and (b) the calendar of said another party, and wherein the information from calendar events includes information from one of (a) upcoming calendar events that relate to said another party and (b) upcoming calendar events that involve said another party.

9. The method of claim 1, wherein the adaptive information is presented audibly.

10. The method of claim 1, wherein the adaptive information is presented graphically.

11. The method of claim 1, wherein the call is a telephone call.

12. The method of claim 11, wherein initiating the call comprises routing the telephone call.

13. The method of claim 12, wherein presenting adaptive information additionally comprises:
    presenting information related to a telephone number being called.

14. A communications device operable to present adaptive information, the device comprising:
    communications circuitry operable to, upon receiving a user command, initiate a call to another communications device to enable a user to speak to another party; and
    processor circuitry operable to select adaptive information, according to an identification of said another party, that includes one of (a) information about the last time the user communicated with said another party and (b) information about unsuccessful attempts to communicate including one of (i) unanswered calls, (ii) voicemails, (iii) unread emails, and (iv) unchecked messages; and
    user interface circuitry, operable to present at least a portion of the adaptive information to the user before the call to said another communications device finalizes, and end the presentation of the adaptive information upon finalization of the call, wherein the user interface circuitry is further operable by the user to define the finalization by configuring a monitorable event, through system-presented options, as being (a) ringing of another communications device of another party and (b) answering of another communications device by another party.

15. The device of claim 14, wherein the user interface circuitry is operable to end the presenting of the adaptive information without notifying the user.

16. The device of claim 14,
    wherein the processor circuitry is to select further adaptive information from one of (a) news, (b) weather, (c) music (d) calendar events, and (e) advertisements that are selected according to one of a characteristic of the call's connection and the user's previous activities.

17. The device of claim 14, wherein the communications circuitry is operable to initiate a cellular telephone call.

18. The device of claim 14, wherein the user interface circuitry includes a display which is operable to present adaptive information graphically.

19. The device of claim 14, wherein the user interface circuitry includes one or more audio speakers which are operable to present adaptive information audibly.

20. The device of claim 14, wherein the user interface circuitry is further operable to notify the user prior to ending the presentation of adaptive information.

21. A communications system comprising:

a first communications device operable to, upon receiving a user command, initiate calls to other devices over a communications network to enable a user of the first communications device to speak to another party, select adaptive information, present the adaptive information to the user in response to the initiation, such that at least a portion of the adaptive information is presented to the user of the first communications device before finalization of a call to a second communications device of said another party, wherein the adaptive information that is presented to the user includes one of (a) information about the last time the user communicated with said another party and (b) information about unsuccessful attempts to communicate, including one of (i) unanswered calls, (ii) voicemails, (iii) unread emails, and (iv) unchecked messages, and is operable to end the presentation of adaptive information upon the finalization of the call, wherein the finalization is defined by a monitorable event that can be configured by the user of the first communications device, through system-presented options, as being (a) ringing of a second communications device of another party and (b) answering of a second communications device by another party.

22. The system of claim 21, wherein the first communications device is a cellular telephone, the communications network is a cellular telephone network.

23. The system of claim 21, wherein the first communications device comprises local storage circuitry operable to store adaptive information, wherein the represented adaptive information is retrieved from said local storage circuitry.

24. The system of claim 21, wherein the presented adaptive information is retrieved by the first communications device in real-time from remote storage.

25. The method of claim 21 wherein the adaptive information further includes information from one of (a) news, (b) weather, (c) music, (d) calendar events, and (e) advertisements that are selected according to one of a characteristic of the call's connection and the user's previous activities.

* * * * *